(12) United States Patent
Trombetta et al.

(10) Patent No.: US 11,286,070 B2
(45) Date of Patent: Mar. 29, 2022

(54) SYSTEM AND METHOD FOR MAKING CAPSULES WITH FILTERS

(71) Applicant: 2266170 Ontario Inc., Mississauga (CA)

(72) Inventors: Liberatore A. Trombetta, Ancaster (CA); Yucheng Fu, Mississauga (CA)

(73) Assignee: 2266170 Ontario Inc., Mississauga (CA)

( * ) Notice: Subject to any disclaimer, the term of this patent is extended or adjusted under 35 U.S.C. 154(b) by 0 days.

(21) Appl. No.: 17/031,218

(22) Filed: Sep. 24, 2020

(65) Prior Publication Data

US 2021/0122511 A1 Apr. 29, 2021

Related U.S. Application Data

(60) Provisional application No. 62/924,748, filed on Oct. 23, 2019.

(51) Int. Cl.
| | |
|---|---|
| *B29C 65/00* | (2006.01) |
| *B65B 29/02* | (2006.01) |
| *B29C 65/02* | (2006.01) |
| *B29C 65/18* | (2006.01) |
| *B29C 65/38* | (2006.01) |
| *B65B 7/28* | (2006.01) |

(52) U.S. Cl.
CPC ............ *B65B 29/022* (2017.08); *B29C 65/02* (2013.01); *B29C 65/18* (2013.01); *B29C 65/38* (2013.01); *B29C 66/43* (2013.01); *B65B 7/2878* (2013.01)

(58) Field of Classification Search
CPC ...... A47J 31/08; B65B 29/022; B65B 29/025; B65D 85/8043; B65D 85/8061; B65D 85/8046
See application file for complete search history.

(56) References Cited

U.S. PATENT DOCUMENTS

| | | | | |
|---|---|---|---|---|
| 9,963,256 | B2 * | 5/2018 | Hansen | B65D 85/8061 |
| 10,464,700 | B2 * | 11/2019 | Rea | B65B 29/02 |
| 2009/0211713 | A1 * | 8/2009 | Binacchi | B65B 61/20 |
| | | | | 156/423 |
| 2014/0230370 | A1 * | 8/2014 | Bianchi | B65B 29/022 |
| | | | | 53/410 |
| 2015/0056341 | A1 * | 2/2015 | Trombetta | B65B 7/2878 |
| | | | | 426/115 |
| 2015/0166204 | A1 * | 6/2015 | Rea | B65B 7/164 |
| | | | | 53/452 |

(Continued)

*Primary Examiner* — Eyamindae C Jallow
(74) *Attorney, Agent, or Firm* — Manelli Selter PLLC; Edward Stemberger

(57) ABSTRACT

A system and process for forming and sealing a filter in a capsule is provided. The system includes a filter forming station having a mandrel for forming a filter preform, a capsule holder for holding a body of a capsule for receiving the mandrel with the filter preform and a filter sealing station including a sealer for sealing the filter preform to the body at a desired location within the interior surface of the body. The mandrel is adapted to hold the filter preform at a desired position for placement and sealing within the body. The process includes forming a filter preform on a mandrel from a filter material, positioning a body of a capsule for receiving the mandrel with the filter preform, the mandrel being adapted to hold the filter preform, and sealing the filter preform at a desired location to an interior surface of the body.

20 Claims, 12 Drawing Sheets

(56) References Cited

U.S. PATENT DOCUMENTS

| | | | |
|---|---|---|---|
| 2015/0246741 A1* | 9/2015 | Hansen | B65D 85/8043 |
| | | | 426/112 |
| 2016/0009427 A1* | 1/2016 | Rea | B65G 47/848 |
| | | | 53/282 |
| 2017/0275085 A1* | 9/2017 | Rapparini | B65B 47/02 |
| 2018/0022012 A1* | 1/2018 | Rapparini | B29C 51/04 |
| | | | 156/242 |
| 2021/0007540 A1* | 1/2021 | Trombetta | B65B 29/022 |

* cited by examiner

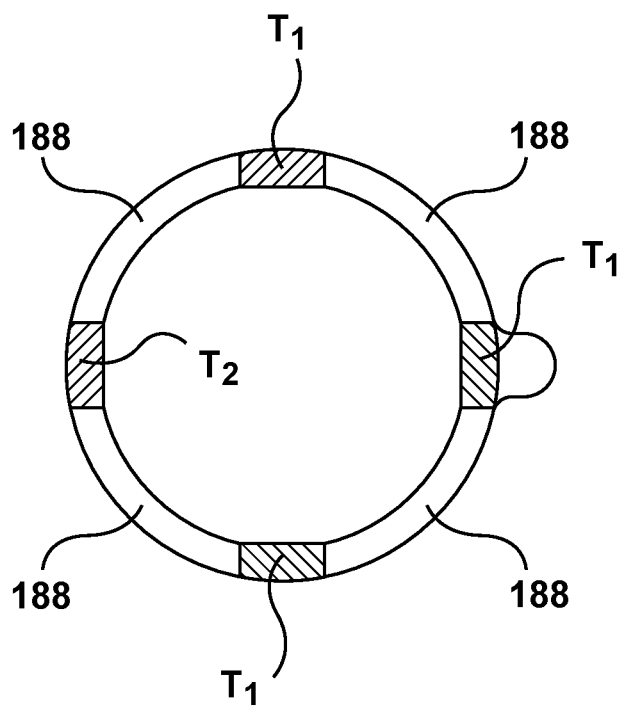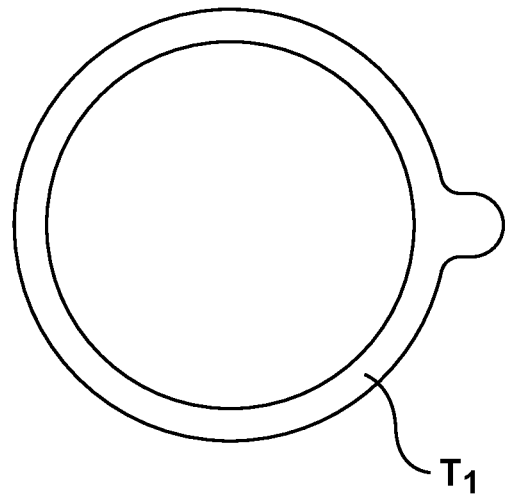
FIG. 17(a)     FIG. 17(b)
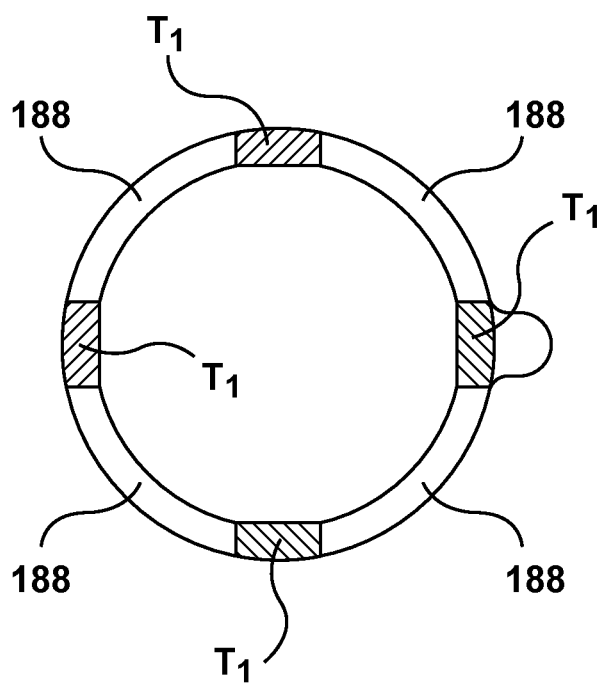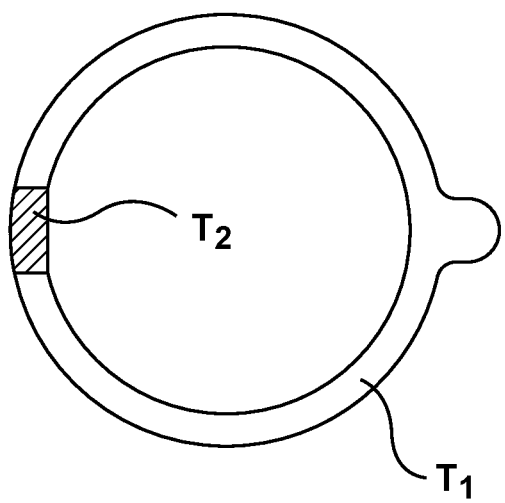
FIG. 18(a)     FIG. 18(b)

SYSTEM AND METHOD FOR MAKING CAPSULES WITH FILTERS

FIELD

This specification relates to capsules containing filters for preparing consumable products, and in particular to systems and methods for forming and sealing filters for such capsules.

BACKGROUND

The following background discussion is not an admission that anything discussed below is citable as prior art or common general knowledge. The documents listed below are incorporated herein in their entirety by this reference to them.

Single serve capsules adapted for use in machines to prepare a desired consumable product from pre-cursor ingredients are becoming increasingly popular. Such capsules come in a variety of formats for producing consumable products such as coffee, tea or hot chocolate.

Beverage capsule machines inject a fluid (typically heated water) into a beverage capsule where it is intended to mix with the pre-cursor ingredients to prepare the desired consumable product prior to the consumable product being dispensed from the capsule. The beverage capsule includes a filter that defines a chamber for containing insoluble pre-cursor ingredients such as coffee grounds or tea leaves.

It has been determined that the use of an ultra-lightweight filter (having a basis weight of 40 g/m2 or less) in such capsules provides a number of advantages in terms of material costs, recyclability and beverage flavors.

A preferred system and method for forming non-woven filters in capsules involves forming a sheet of moldable nonwoven filter material into a desired size and shape within the body of a capsule and then sealing the formed filter to the body of the capsule.

The problem however is that it can be difficult to work with ultra-light filter materials and in particular it can be difficult to form and seal such filters into capsules on a commercial scale.

There is a need for a system and process for making capsules containing ultra-lightweight filter materials and in particular for forming and sealing ultra-lightweight filter materials into capsules.

SUMMARY

In one aspect the invention provides a system for forming and sealing a filter material into a capsule, the system comprising:
  a filter forming station having at least one mandrel for forming a filter preform having a desired size and shape;
  a capsule holder for holding a body of a capsule in a position for receiving said mandrel with said filter preform;
  a filter sealing station including a sealer for sealing said filter preform to said body at a desired location within the interior surface of said body;
  wherein said mandrel is adapted to hold said filter preform at a desired position for placement and sealing within said body.

In another aspect, the invention provides a process for forming and sealing a filter material into a capsule, the process comprising the steps of:
  forming a filter preform having a desired size and shape on a mandrel from a desired filter material;
  positioning a body of a capsule in a position for receiving said mandrel with said filter preform, said mandrel being adapted to hold said filter preform at a desired position for placement and sealing within said body; and
  sealing said filter preform at a desired location to an interior surface of said body.

Other aspects and features of the teachings disclosed herein will become apparent, to those ordinarily skilled in the art, upon review of the following description of the specific examples of the specification.

DRAWINGS

The drawings included herewith are for illustrating various examples of articles, methods, and apparatuses of the present specification and are not intended to limit the scope of what is taught in any way. For simplicity and clarity of illustration, where considered appropriate, reference numerals may be repeated among the drawings to indicate corresponding or analogous elements.

Figure 16:
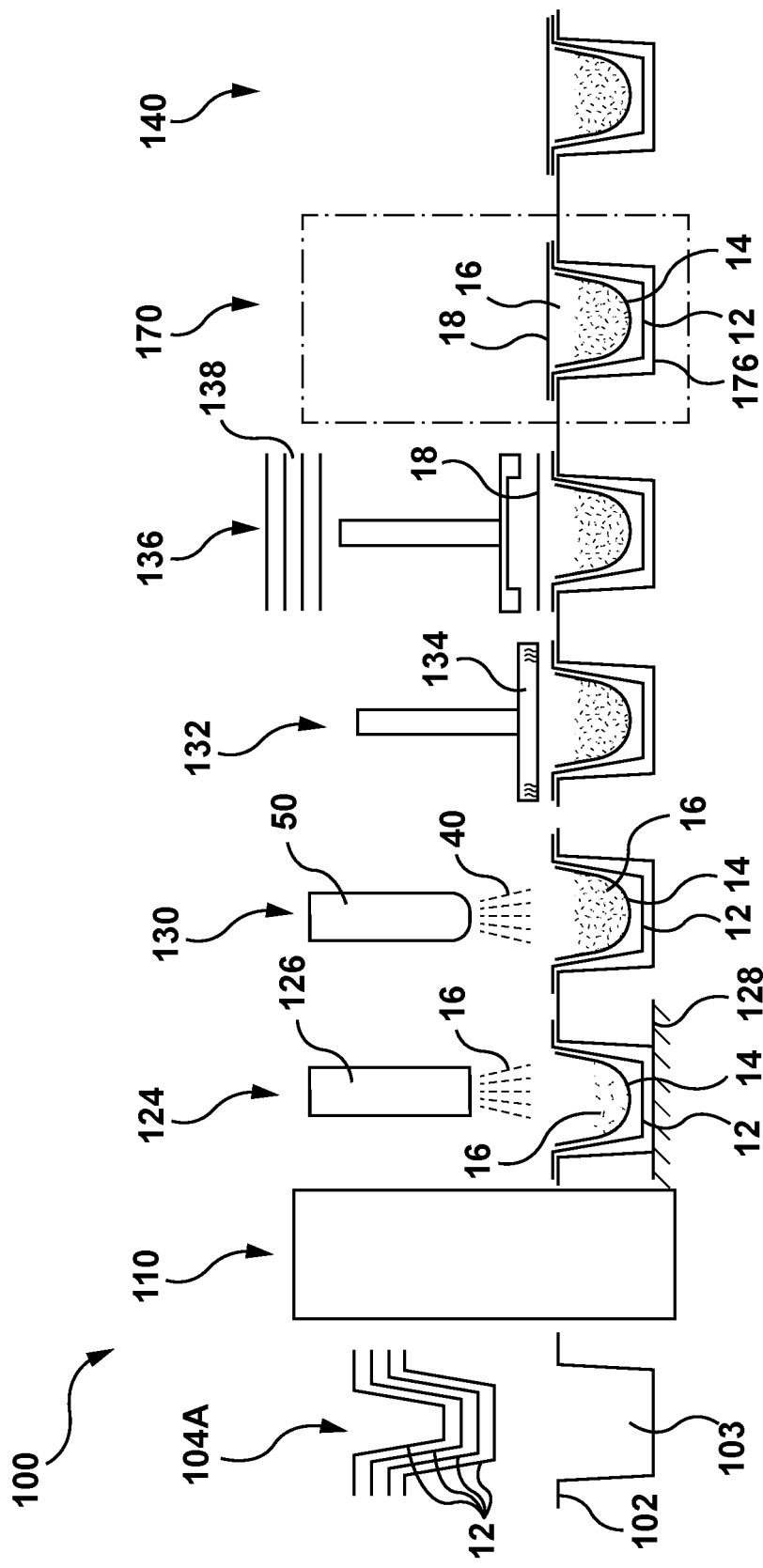

FIG. 16 a more detailed schematic view of a manufacturing system for manufacturing a capsule in accordance with the present invention FIGS. 17(*a*) and (*b*) are schematic views of the hinge sealing process in accordance with the present invention; and FIGS. 18(*a*) and (*b*) are schematic views of an alternate hinge sealing process in accordance with the present invention.

DESCRIPTION OF VARIOUS EMBODIMENTS

Various apparatuses or methods will be described below to provide examples of the claimed invention. The claimed invention is not limited to apparatuses or methods having all of the features of any one apparatus or method described below or to features common to multiple or all of the apparatuses described below. The claimed invention may reside in a combination or sub-combination of the apparatus elements or method steps described below. It is possible that an apparatus or method described below is not an example of the claimed invention. The applicant(s), inventor(s) and/or owner(s) reserve all rights in any invention disclosed in an apparatus or method described below that is not claimed in this document and do not abandon, disclaim or dedicate to the public any such invention by its disclosure in this document.

A capsule in accordance with the present invention is shown generally at 10 in the Figures. Capsule 10 includes a body 12, filter 14, ingredients 16 and cover 18.

Capsule 10 is sized and configured for use in a machine 20 that is adapted for preparing a product from capsule 10.

Machine 20 includes an injection system 22 for injecting a fluid, typically heated water, into the capsule 10 for mixing with ingredients 16. Injection system 22 may include at least one injection nozzle 22a disposed on machine 20 that is adapted to pierce cover 18 to inject fluid into capsule 10.

Machine also includes a dispensing system 24 for dispensing product from capsule 10 into a desired receptacle such as a bowl or cup. Dispensing system 24 may include a probe 24a that is adapted to pierce capsule 10 to dispense a prepared product from capsule 10.

In an alternative embodiment, which is commonly used with high pressure espresso machines (not shown), dispensing system 24 may be provided within the capsule 10 instead of the machine 20. Capsule 10 may for example have at least one component disposed within capsule 10 that is adapted to move under exposure to pressure to pierce a portion of capsule downstream of injection system 22 to dispense the prepared product. Alternatively, pressure within the capsule may cause a portion of the capsule to break upon contact with a portion of the machine 20 to dispense the prepared product.

Body 12 of capsule 10 includes a sidewall 30 and an end wall 32 together defining an interior space 34. Interior space 34 preferably has a volume in the range of 30 cc to 100 cc for preparing a single serving of beverage and more preferably a volume in the range of 40 cc to 80 cc.

An opening 36 is defined at one end of body 12 and a flange 38 extends around the perimeter of opening 36 to receive cover 18 and to support capsule 10 within machine 20. Filter 14 may be secured to an interior surface of capsule 10 (such as to sidewall 30). Filter 14 is formed to define an ingredients chamber 40 within interior space 34 for receiving and filtering at least some of ingredients 16.

In another embodiment (not shown), body 12 may be formed with no end wall 32 and no sidewall 30 or a partial sidewall 30. Flange 38 may still extend around the perimeter of opening 36 to receive cover 18 and to support capsule 10 within machine 20. Filter 14 may be secured to partial sidewall 30 to define ingredients chamber 40.

Preferably, filter 14 is formed of an ultra-lightweight non-woven polymer fabric having a basis weight that is 40 grams or less per square meter (gsm), preferably in the range of 5 to 40 gsm, more preferably between 10 to 30 gsm and even more preferably 25 gsm or less and most preferably in the range of 10-25 gsm.

Filter 14 (more specifically filter fabric) preferably has the material properties specified below to facilitate optimum cutting of filter 14 during the manufacture of capsule 10.

Filter 14 preferably has a tensile strength of less than 100 N/5 cm—in the Machine Direction (MD) and less than 70 N/5 cm in the Cross Direction (CD), preferably in the range of 20-70 N/5 cm MD and 10 to 40 N/5 cm CD, and more preferably in the range of 20-60 N/5 cm MD and 10 to 30 N/5 cm CD. The test method used to measure tensile strength test is described under ISO 9073.3.

Filter 14 preferably has a material tear strength of less than 15 N MD and less than 20 N CD, preferably in the range of 1-12 N MD and 1-15 N CD, and more preferably in the range of 3-10 N MD and 3-10 N CD. The test method used to determine material tear strength is described under ISO 13937.2.

Filter 14 preferably has an elongation to break value of less than 50% MD and less than 40% CD, and more preferably less than 40% MD and less than 30% CD. The test method used to determine elongation to break value is described under ISO 9073.3.

Ingredients 16 may include insoluble ingredients 16, such as tea leaves, coffee grounds, herbs, spices or other ingredients, that are disposed in ingredients chamber 40 and adapted for forming a consumable product by extraction or infusion using machine 20. Additional ingredients 16 may be disposed in ingredients chamber 40 or elsewhere in interior space 34. Such additional ingredients 16 may include soluble ingredients 16 such as coffee, chocolate, soup stock, flavor additives or other ingredients in powdered, crystallized or other forms adapted for solubility or contained within a soluble film or pouch. Additional ingredients 16 may also include active ingredients (e.g. foaming agents), natural health additives, regulated drugs, alcohol or other soluble or insoluble ingredients.

Cover 18 is disposed over opening 36 and secured to body 12 such as by sealing cover 18 directly to flange 38. Cover 18 may be formed of a polymer material that is resistant to tearing and adapted to shrink upon exposure to heat. Cover 18 may thus be adapted to shrink around the opening formed in cover 18 by injection system 22 to form a sufficient seal to withstand the buildup in pressure within capsule 10 under normal conditions during use in machine 20. In other words, cover 18 may be adapted to shrink sufficiently around the at least one injection nozzle when the at least one injection nozzle pierces the cover and injects heated fluid into the capsule to create a seal and allow the buildup in pressure within capsule up to a maximum pressure. Alternatively, cover 18 may be formed of a metallic foil material such as aluminum foil.

In a preferred embodiment, components of capsule 10 (not including ingredients 16) are formed from a single, substantially pure, type of material. This is also referred to herein as a mono-material capsule made with mono-material components. The type of material is selected based on factors including recyclability, ease of manufacturing, durability and desired shelf life. Thus body 12, filter 14 and cover 18 each may be separate components that each are formed from the same, substantially pure, type of material. Alternatively, body 12 and filter 14 each may be formed from the same, substantially pure, type of material and cover 18 may be formed of a different material.

The term "substantially pure" is defined herein to mean at least 90% of the same type of material by weight (90%/wt), preferably at least 95%/wt, even more preferably at least 97%/wt and most preferably 100%/wt. The remaining different type of materials may include residual materials such as adhesives, barrier materials and print coatings. As noted above, the desired purity is determined in part by choice of material and shelf life considerations (for example, certain ingredients 16 may require little or no barrier protection or may have a shorter shelf life).

One preferable type of material for forming the components of the capsule 10 is polypropylene (PP) (which may include variants such as cast polypropylene (CPP)). Another preferable type of material is polyethylene terephthalate (PET) (which may include variants such as cast polyethylene terephthalate (CPET)). The PP and PET (and their variants) may be 100% fossil fuel based or it may be a mix of fossil fuels, post-recycled material and/or or bio-resins. Another preferable type of material is aluminum. Yet another preferred type of material is polylactic acid (PLA) for its biodegradable properties. The invention is not intended however to be restricted to any specific type of material provided that it is a single, substantially pure, type and that it meets the needs for operation of the capsule 10 in the machine 20.

Figure 4:
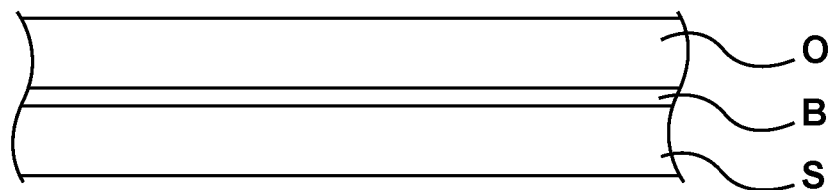
FIG. 4 is a schematic cross-sectional view of a material for forming the body and/or cover of the capsule of FIG. 1.

Referring to FIG. 4, a schematic view of a cross-section of material that may be used for body 12 and/or cover 18 is shown. Material is preferably a multi-layered material that includes an outer layer O, a barrier layer B and a sealing layer S. Outer layer may for example be formed of PP, barrier layer B may be formed of a glass coating of aluminum oxide or silicon oxide and sealing layer may be formed of CPP (which is considered herein to be the same type of material as PP). Barrier layer B is formed of a different type of material however the overall material is still within the defined ranges of being substantially pure.

Figure 5:
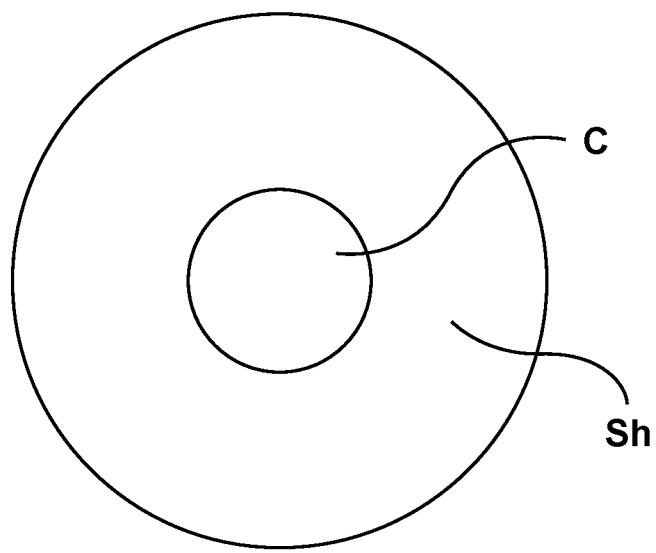
FIG. 5 is a schematic cross-sectional view of a fiber for forming the filter of the capsule of FIG. 1.

Referring to FIG. 5, a schematic view of a cross section of a fiber for forming filter 14 is shown. Fiber is preferably a multi-component material that includes a sheath material Sh surrounding a core material C. Sheath Sh may for example be formed of CPP and core may for example be formed of PP. In a preferred embodiment a single core is provided. Core material C preferably has a higher melt point than sheath material Sh.

In some embodiments, cover 18 may be formed of a different type of material from body 12 and filter 14 provided that cover 18 may be easily separated from the remainder of the capsule 10 following use or is otherwise compatible from a recycling standpoint. For example, body 12 and filter 14 may be formed of PP and cover 18 may be formed of aluminum foil. Following use, the consumer may separate the cover 18 from the remainder of the capsule 10 so that the cover 18 may be placed into one stream of recycling and the remainder of the capsule 10 may be placed into another stream of recycling (with the consumer optionally also placing used ingredients 16 from capsule 10 into another stream for composting).

Preferably however, cover 18 is formed from the same type of material as the body 12 and filter 14 of capsule 10. In such instances, it is desirable that cover 18 remain at least partially attached to the remainder of capsule 10 in order that capsule 10 with cover 18 attached may be disposed into the same recycling stream. This avoids placing small components (such as cover 18) separately into the recycling stream where they may not be large enough to be mechanically collected for recycling. Preferably, a hinge 50 is formed on one or both of cover 18 and body 12 to allow cover 18 to be lifted or peeled partially away from the remainder of capsule 10 to allow ingredients 16 to be discarded (preferably to compost) while ensuring that cover 18 remains tethered to the remainder of capsule 10. A tab 52 may also be provided to assist the user with lifting or peeling away cover 18.

Figure 2:
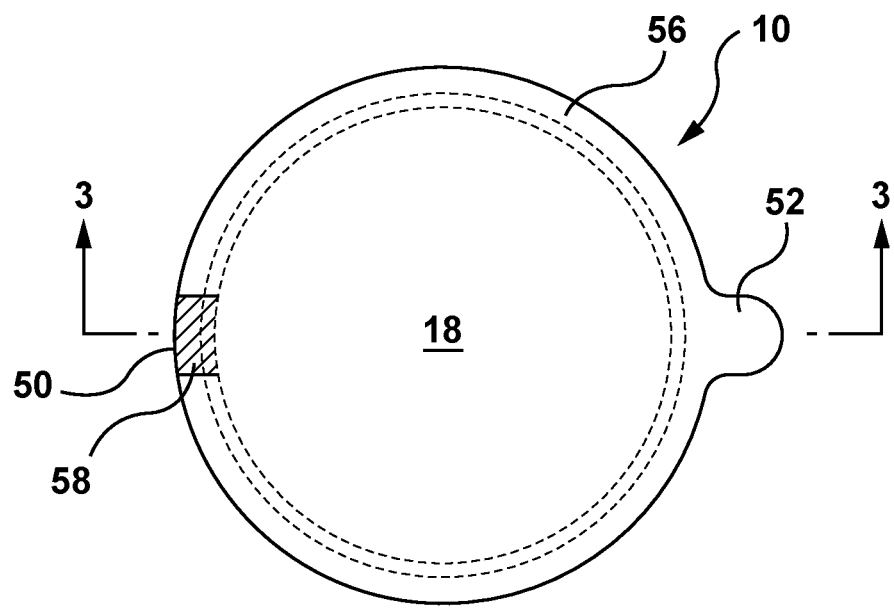
FIG. 2 is a top view of the capsule of FIG. 1.
Figure 3:
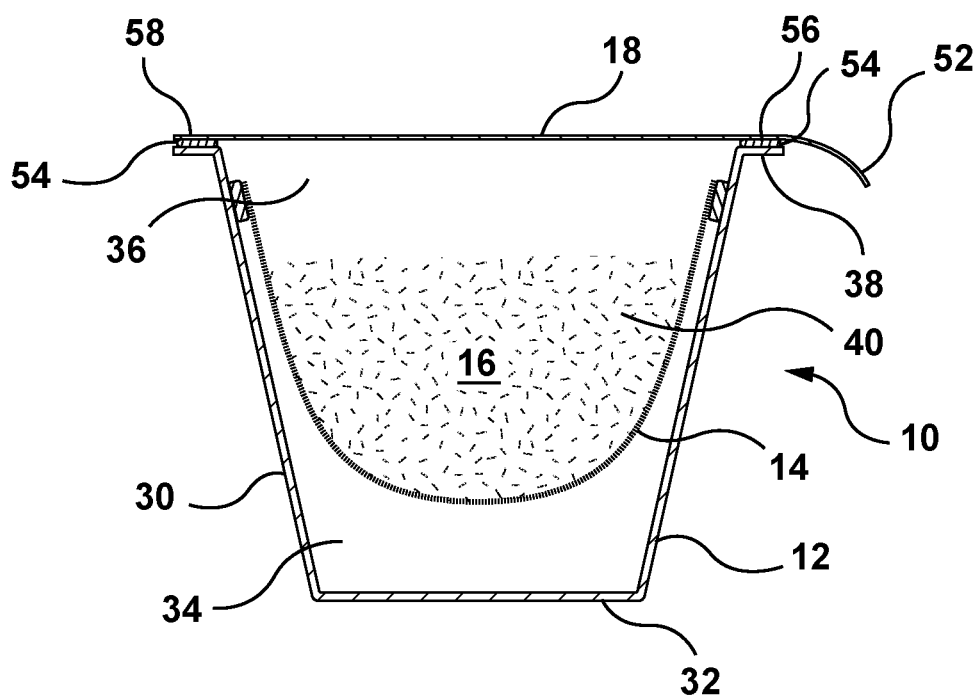
FIG. 3 is a sectional view of the capsule of FIG. 1 as viewed along lines 3-3.

Referring to FIGS. 2 and 3, a preferred structure for hinge 50 is shown. Capsule 10 includes a seal 54 between the underside of cover 18 and the top of flange 38 around the circumference of body 12. Seal 54 includes a peel zone 56 and a hinge zone 58. Seal 54 for peel zone 56 is a peelable seal between cover 18 and flange 38 that allows a consumer to peel cover 18 away from flange 38 by hand without excessive effort. Seal 54 for hinge zone 58 has a more secure seal between cover 18 and flange 38 that does not allow a consumer to peel cover 18 away from flange 38 by hand without excessive effort. In other words, hinge zone 58 has a higher seal or bond strength than peel zone 56. Preferably, hinge zone 58 has a seal or bond strength that is at least 1.5 times as strong as the strength of peel zone 56 and even more preferably at least 2 times as strong. Seal or bond strength may be measured following the principals of ASTM F904.

Figure 6:
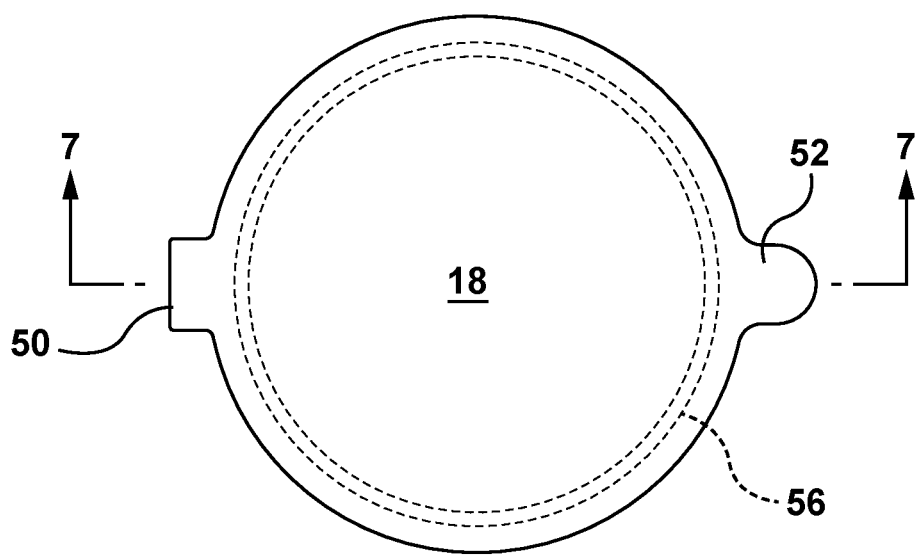
FIG. 6 is a top view of another embodiment of the capsule of FIG. 1 showing a different hinge structure.
Figure 7:
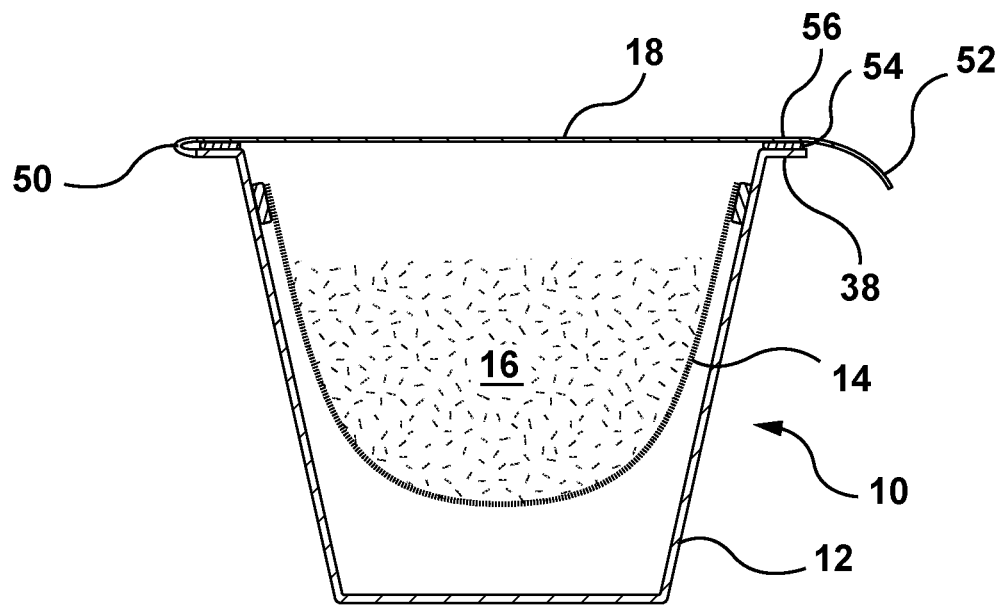
FIG. 7 is a sectional view of the capsule of FIG. 6 as viewed along lines 7-7.

Referring to FIGS. 6 and 7, another structure for forming hinge 50 is shown. Similar reference numerals are used to refer to similar elements for the embodiments described herein. Capsule 10 includes an integral connection between body 12 and cover 18. Hinge 50 is integrally formed from both body 12 and cover 18 to allow cover 18 to be opened following use. Cover 18 may be sealed to flange 38 with seal 54 in the form of a peelable seal around the entire circumference of body 12 or cover 18 may be adapted to snap fit to body 12 (not shown).

Figure 8:
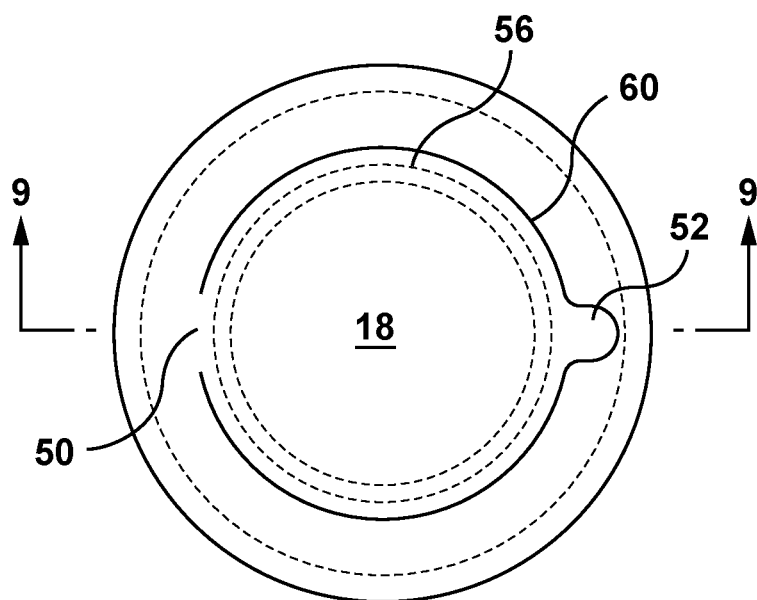
FIG. 8 is a top view of another embodiment of the capsule of FIG. 1 showing a different hinge structure.
Figure 9:
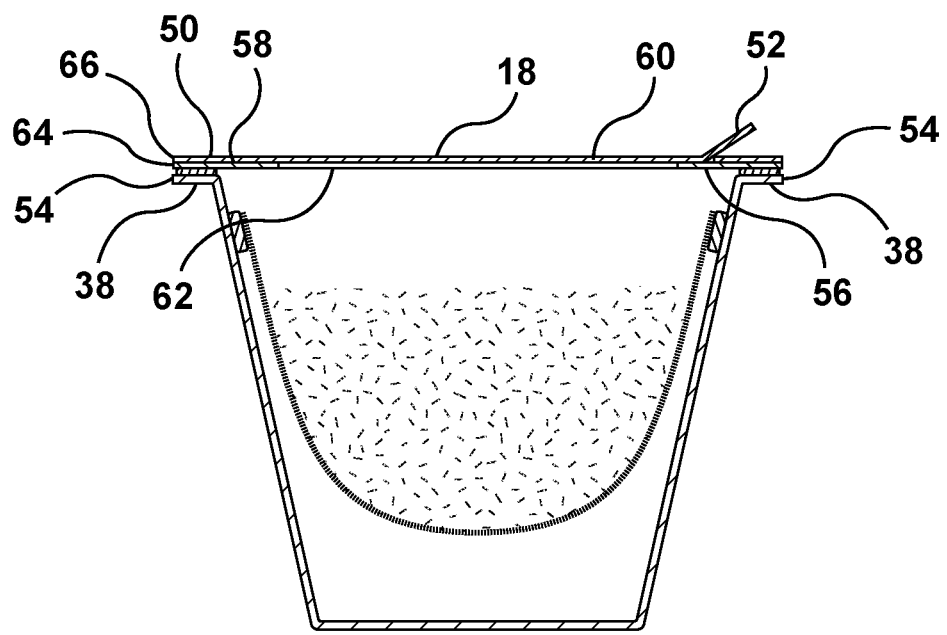
FIG. 9 is a sectional view of the capsule of FIG. 8 as viewed along lines 9-9.
Figure 10:
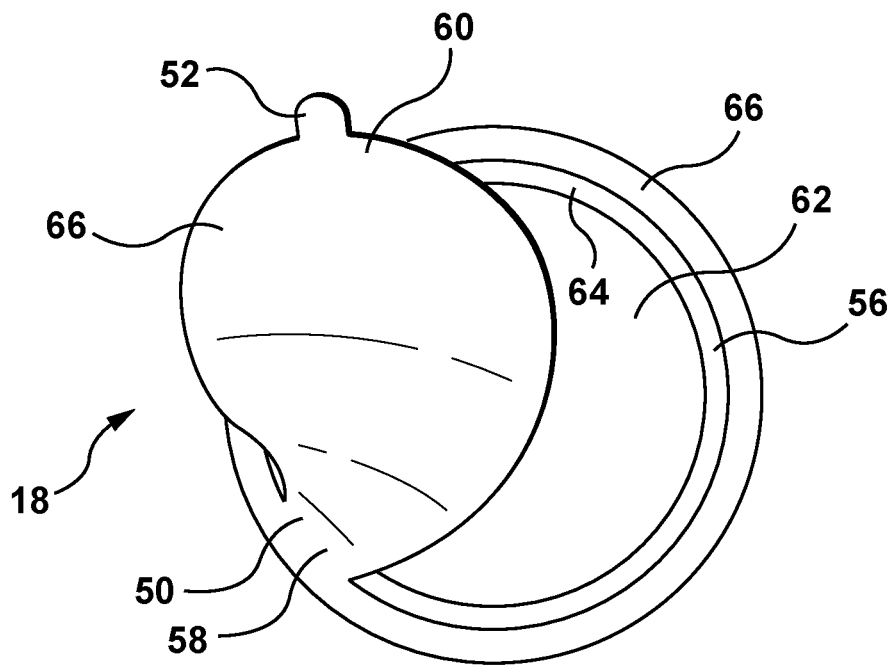
FIG. 10 is a perspective view of the capsule of FIG. 8 showing the flap open.

Referring to FIGS. 8-10, another structure for forming hinge 50 is shown. Similar reference numerals are used to refer to similar elements for the embodiments described herein. Capsule 10 includes a more secure seal 54 between the underside of cover 18 and the top of flange 38 around the circumference of body 12. Cover 18 includes a flap 60 that may be lifted or peeled away from the remainder of cover 18 to permit access to the contents of capsule 10. Cover 18 may be formed of a multi-layered material with an aperture 62 defined in a base layer 64 and flap 60 defined in a top layer 66 to cover aperture 62. Base layer 64 includes a peel zone 56 extending around a substantial portion of the periphery of aperture 62. Seal 54 for peel zone 56 is a peelable seal between flap 60 and base layer 64. Tab 52 may also be provided on flap 60 to assist the user with lifting or peeling away flap 60. Hinge 50 is preferably disposed on hinge zone 58 of flap 60.

Figure 11:
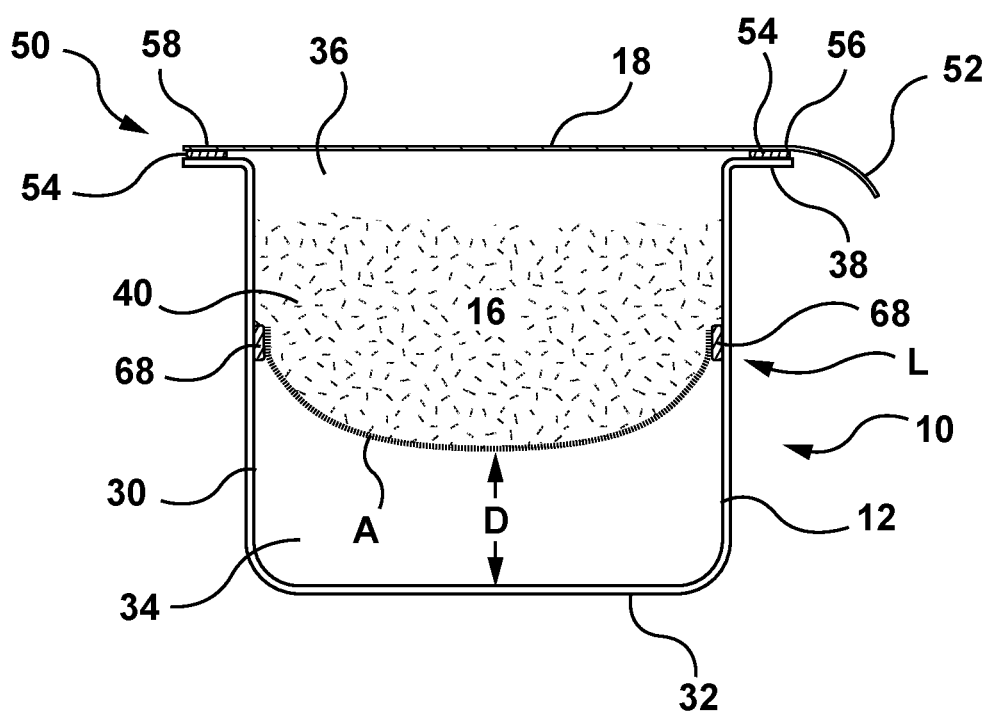
FIG. 11 is a sectional view of the capsule in accordance with another embodiment of the present invention.

Referring to FIG. 11, another embodiment for capsule 10 is shown. Similar reference numerals are used to refer to similar elements for the embodiments described herein.

Figure 1:
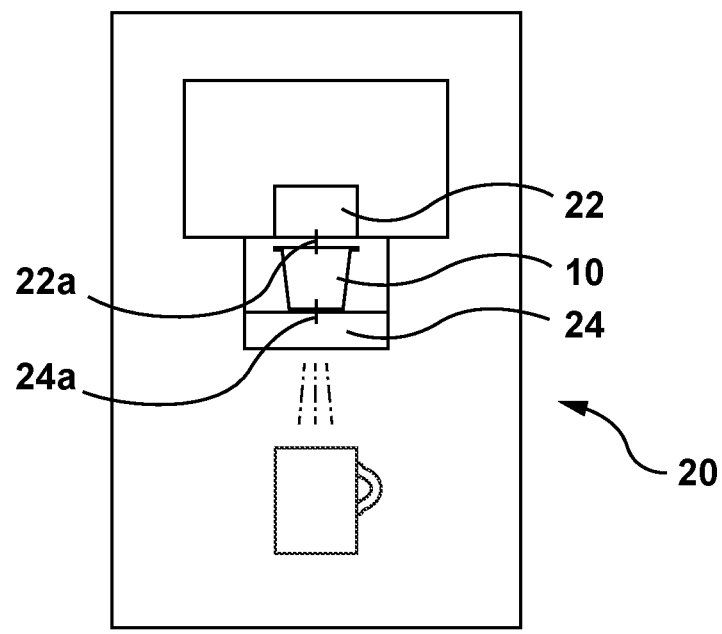
FIG. 1 is a schematic view of a capsule in accordance with one aspect of the present invention disposed in a machine for preparing a beverage.

Capsule 10 includes filter 14 that is secured with a seal 68 to an interior surface of body 12 fully around the circumference of sidewall 30 at a location L between opening 36 and end wall 32. Preferably, filter 14 is spaced away from opening 36 (i.e. not proximate to opening 36). More preferably, filter 14 is secured to body 12 at a location that is in the middle ⅓ of the distance between opening 36 and end wall 32. Filter 14, at its lowest point, is preferably spaced a distance D from end wall 32. Distance D is selected to avoid filter 14 being contacted by hollow probe 24a of dispensing system 24 during use of capsule 10 in machine 20 (as shown in FIG. 1).

Filter 14 forms a cup shaped area for containing and filtering ingredients 16. Filter 14 includes a sufficient surface area A for allowing fluid to flow through filter 14 at a desired rate during the preparation of the beverage product. Preferably, for a capsule having a volume of 40-80 cc, filter 14 has a surface area of 10-70 cm2. More preferably, filter 14 has a surface area of 15-50 cm2. Filter 14 and body 12 are formed from the same substantially pure material and thus, filter 14 may be secured with seal 68 to body 12 using a heat seal that causes the materials to melt and securely bond together to form seal 68 that does not allow ingredients 16 to bypass filter around seal 68.

Figure 12:
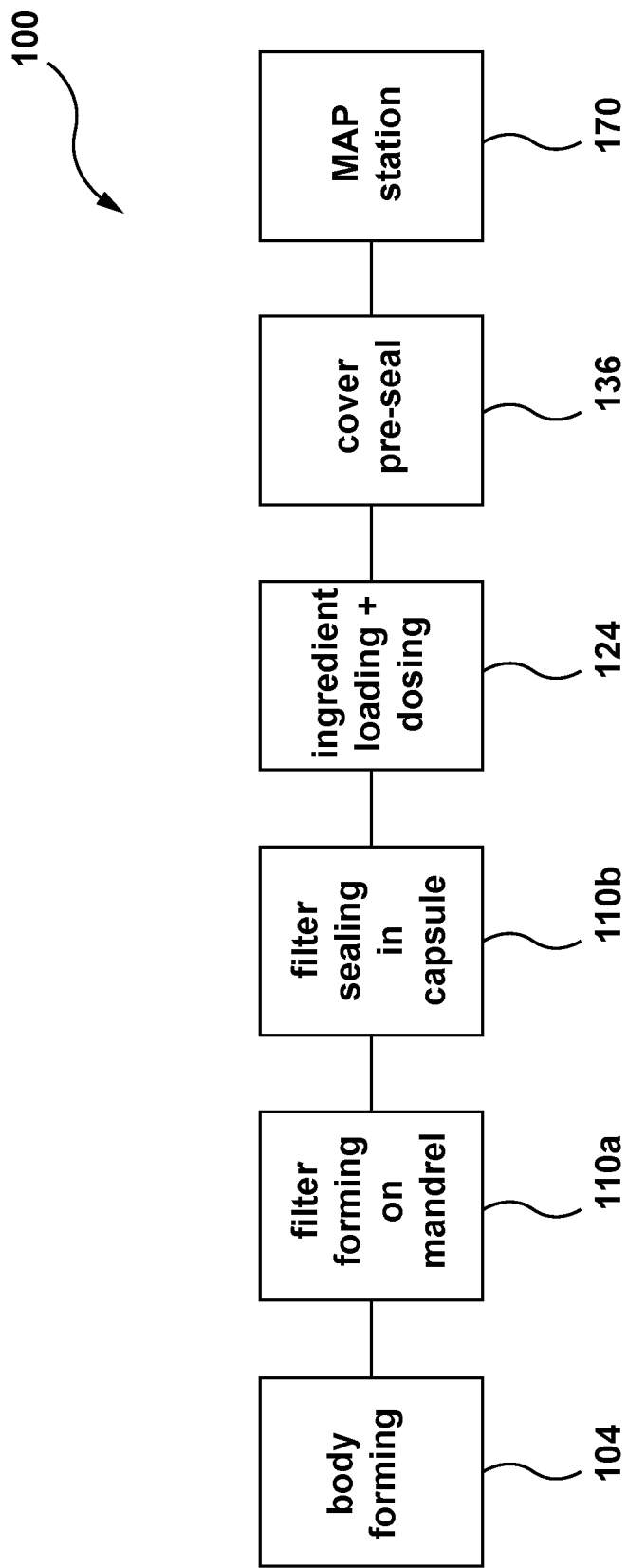
FIG. 12 is a schematic view of a manufacturing system for manufacturing a capsule in accordance with the present invention.
Figure 13:
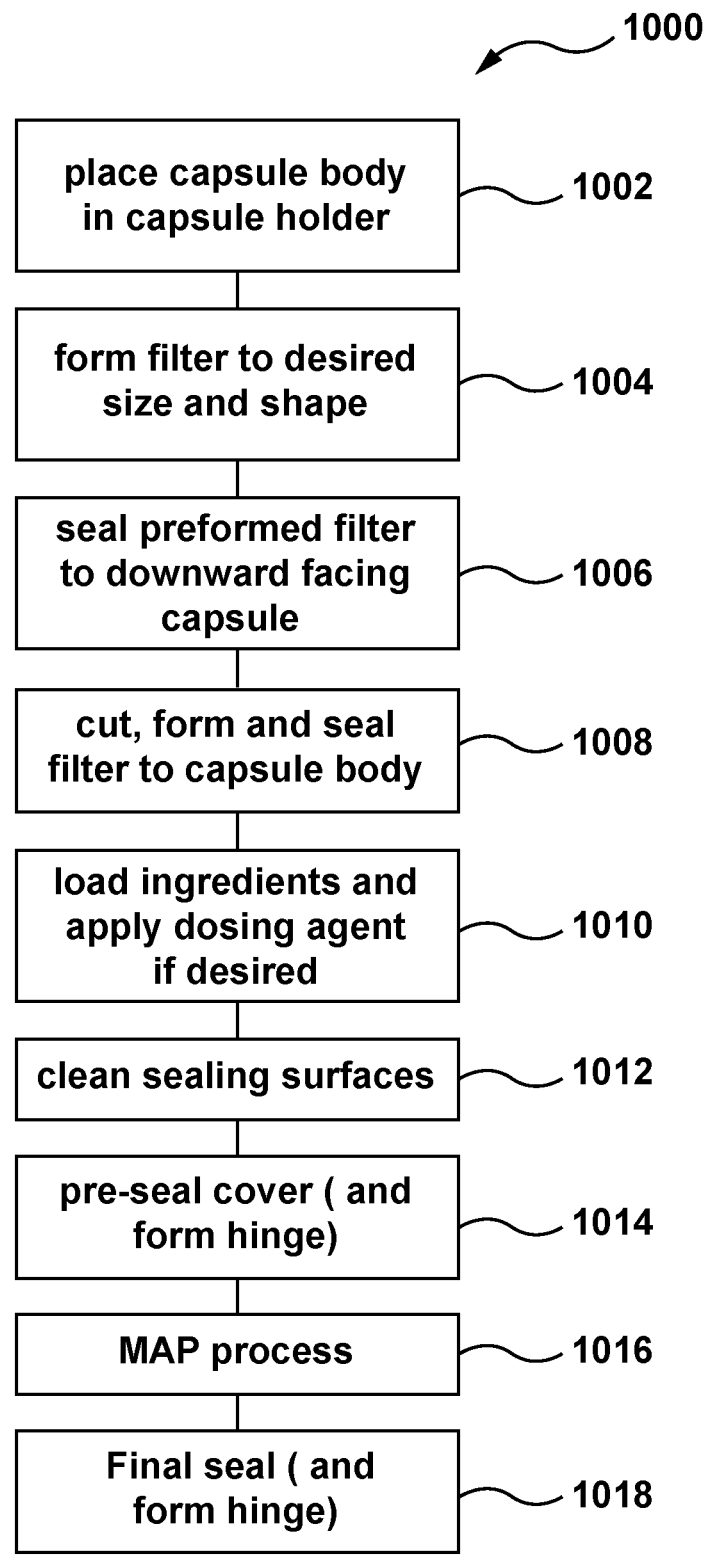
FIG. 13 is a flow chart depicting a method for manufacturing a capsule in accordance with the present invention.

Referring to FIGS. 12-13, schematic views of a system 100 and a process 1000 for making capsules 10 is shown.

System 100 includes a body forming station 104 for forming bodies 16 of capsules 10 that are disposed in corresponding capsule holders as provided by process step 1002. Bodies 16 may for example be thermoformed from a sheet of body material. Alternatively, bodies 16 may be preformed and supplied in a nested format to system 100 at station 104 where they may be subsequently denested for further operations.

System 100 further includes a filter forming station 110a for forming a filter material into a desired filter size and shape as provided at process step 1004. Filter material may be provided on a roll and cut at station 110 or provided in precut portions. Filter material is preformed on a mandrel to a desired size and shape that is adapted to fit within body 16 of capsule 10.

Preforms of filters 14 disposed on mandrels are then sealed to bodies 16 at a filter sealing station 110b as provided at process step 1006.

Given the ultra-lightweight material desired for filter 14, there is a need for ensuring that filter preforms remain disposed on the mandrels for accurate placement and sealing within bodies 16 of capsules. This may be provided with the assistance of an attractive relationship between the mandrel and the filter preform. A roughened exterior surface of the mandrel may provide sufficient frictional contact to maintain the positioning of filter preform. A vacuum imparted within mandrel may also assist in maintaining the filer preform in place. A physical attraction between the material for filter preform and the mandrel may also aid in maintaining the position of filter preform on the mandrel. Most preferably however, bodies 16 of capsules 10 are positioned in a downward facing orientation where openings of bodies are facing downwardly. Conversely, mandrels with preforms of filters are positioned in an upward facing orientation with gravity thus aiding to hold the filter preform in place on the mandrel.

Mandrels are inserted into openings of bodies 16 a desired distance and the preforms of filters disposed on mandrels are sealed around the circumference at a desired location to the interior surface of sidewall of bodies 16. There are a number of ways that bodies 16 and mandrels with preforms of filters may be positioned in their respective orientations for sealing filters as discussed in more detail with reference to FIGS. 14 and 15 below.

Bodies 16 with filters 14 sealed to sidewall are then transferred to the ingredient loading station where they are positioned in an upward facing orientation where openings of bodies are facing upwardly. Ingredients 16 are then loaded into the ingredients chamber defined by filter 14 of each capsule as provided at process step 1008. If desired, a dosing agent may also be deposited into ingredients chamber.

Capsules with loaded ingredients are then transferred to a sealing station where sealing surfaces are cleaned, as provided at process step 1010, and cover is sealed to flange of capsule. If system 100 is disposed in an oxygen free environment then cover may be fully sealed to flange of capsule. Otherwise, cover is only sealed at certain portions to flange, as provided at process step 1012, with certain portions remaining unsealed in order to allow gas to escape at the MAP station as described below.

If system 100 is not disposed in an oxygen free environment, capsules 10 with partially sealed covers are transferred to a MAP station, as provided at process step 1014, where oxygen is removed from capsules and replaced with an inert gas and cover is subsequently fully sealed to flange as provided at process step 1016.

Figure 14:
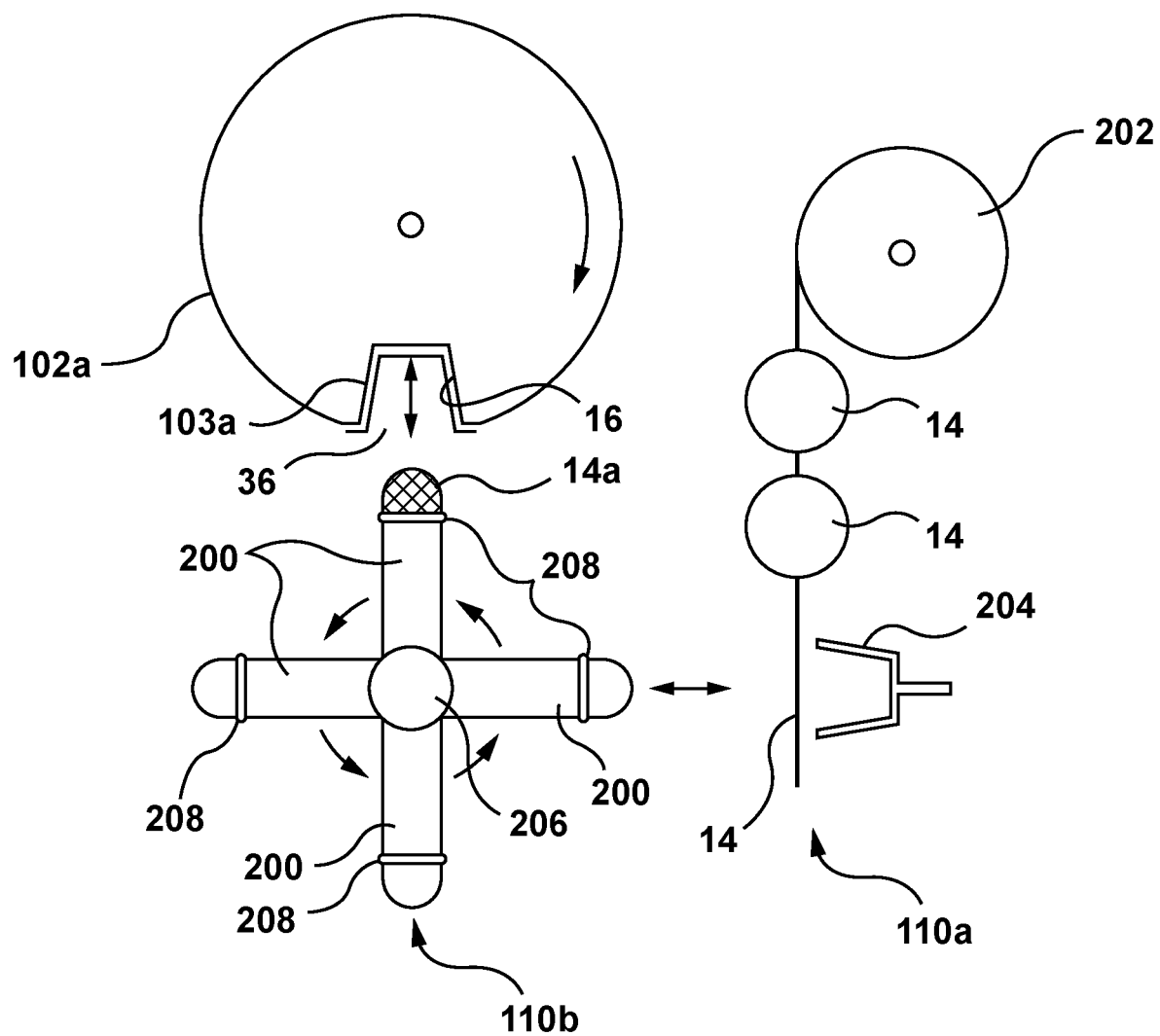
FIG. 14 is a schematic view of a filter forming station and filter sealing station in accordance with the present invention.

Referring to FIG. 14, one embodiment of filter forming station 110a and filter sealing station 110b are shown.

Filter forming station 110a includes a plurality of mandrels 200, a roll of filter material 202 and a head 204 for forming a filter preform 14a having a desired size and shape on mandrel 200. Mandrels are disposed on a rotary element 206 for rotating mandrels 200 from filter forming station 110a to filter sealing station 110b.

Filter forming station 110a may include a supply of pre-cut filter material 14 with each filter material 14 being sized to be preformed to a desired size and shape on mandrel 200. Pre-cut filter material 14 may be picked from a pre-cut filter supply (not shown) or spooled from roll 202 of precut filter material connected in a daisy chain (as shown). Filter material is then positioned between mandrel 200 and head 204. One or both of mandrel 200 and head 204 may then be moved relative to one another to engage filter material 14 to form filter preform 14a on mandrel 200. Preferably filter material 14 is not stretched in the process of firming filter preform 14a.

Filter sealing station 110b includes a capsule holder 103a on a rotary transfer element 102a that is adapted to rotate to a position where capsules 10 are held in a downward facing orientation (with opening 36 of body 16 facing downwardly). Mandrel 200 with filter preform 14a is rotated on rotary element 206 to a position where mandrel 200 is disposed in an upward facing position aligned with opening 36 of body 16 of capsule 10 disposed in secondary capsule holder 103a. While only a single secondary capsule holder 103a and corresponding mandrel 200 is shown it will be understood that multiple secondary capsule holders 103a and corresponding mandrels 200 may be provided in order that manufacturing operations may be performed simultaneously on multiple capsules at filter station 110.

Mandrel 200 is then moved linearly along its axis to a desired location for sealing filter preform 14a to sidewall 30 of body 16. Alternatively, the end portion of mandrel 200 may extend linearly relative to the remainder of mandrel 200 along the axis of mandrel 200 to the desired location for sealing filter preform 14a to sidewall 30 of body 16.

Once mandrel 200 with filter preform 14a is disposed at a desired location within body 16 of capsule 10, filter preform 14a is sealed with sealer 208 to interior sidewall 30 of body 16 fully around its circumference. Seal may be an ultrasonic seal or other suitable sealing technique. Sealer 208 may be incorporated within mandrel 200 or may be provided as a separate sleeve that may be disposed at the desired location for sealing within body 16.

Once filter preform 14a is sealed to body 16 of capsule 10, body 16 with filter 14 may be transferred using transfer element 102a to subsequent stations for further operations.

Figure 15:
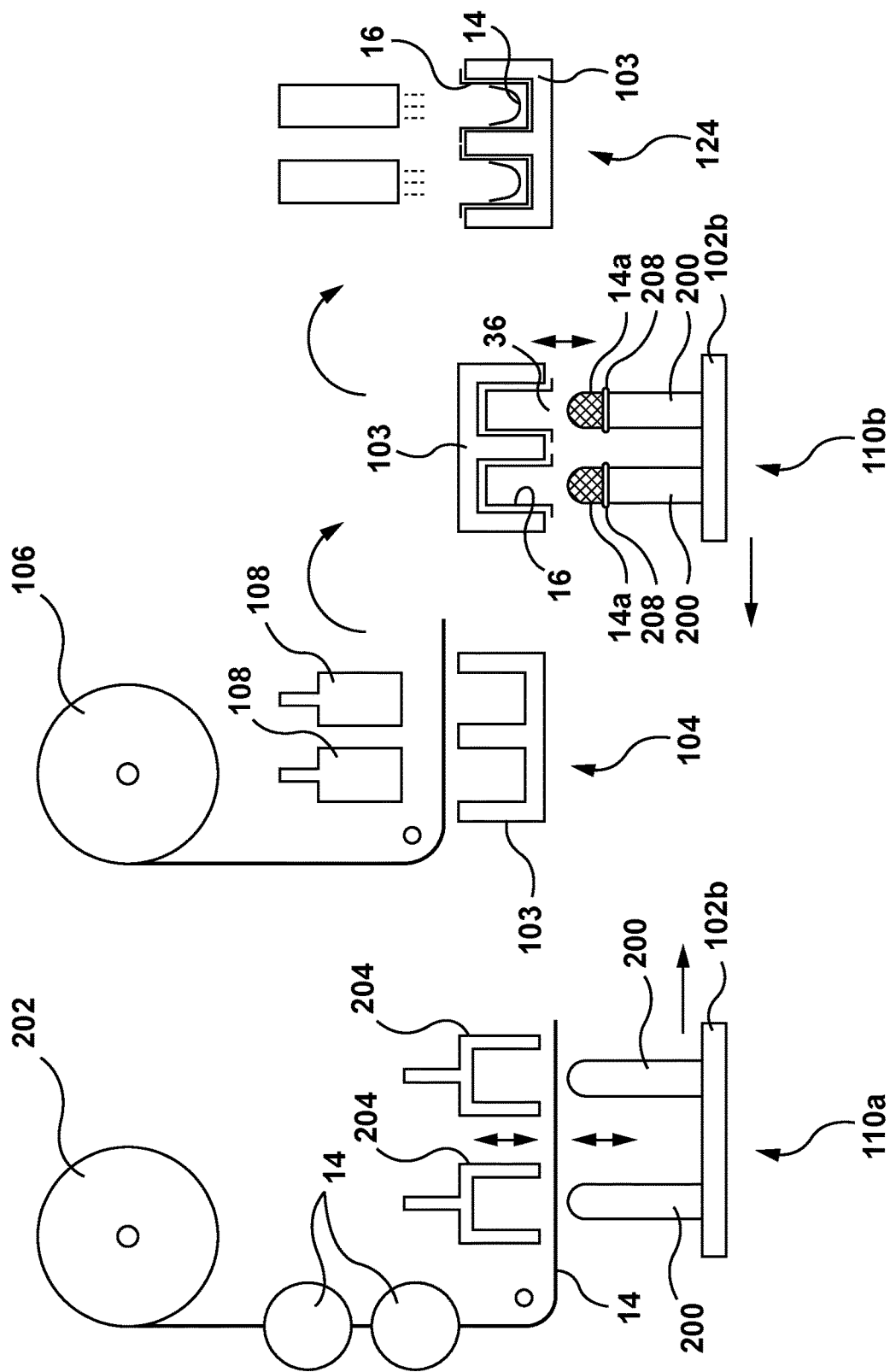
FIG. 15 is a schematic view of a filter forming station and filter sealing station in accordance with another embodiment of the present invention.

Referring to FIG. 15, another embodiment of filter forming station 110a and filter sealing station 110b are shown together with body forming station 104 and ingredients loading station 124. Similar reference numerals are used to refer to similar elements for the embodiments described herein.

Filter forming station 110a includes a plurality of mandrels 200, a roll of filter material 202 and a plurality of heads 204 for forming a filter preform 14a having a desired size and shape on mandrels 200. Mandrels 200 are disposed on a transfer belt 102b for transferring mandrels 200 with filter preforms 14a to filter sealing station 110b.

Body forming station 104 includes a plurality of capsule holders 103, a roll of body material 106 and a plurality of mandrels 108 that are sized and shaped to form bodies 16 of capsules 10 in capsule holders 103. Capsule holders 103 with bodies 16 are then transferred to filter forming station 110b and inverted so that bodies 16 are disposed with openings 36 in a downward facing orientation over mandrels 200 with filter preforms 14a in an upward facing orientation. Mandrels 200 are inserted into openings 36 of bodies 16 a desired distance and filter preforms 14a disposed on mandrels 200 are sealed with sealer 208 around the circumference at a desired location to the interior surface of sidewall 30 of bodies 16. Sealer 208 may be incorporated within mandrel 200 or may be provided as a separate sleeve that may be disposed at the desired location for sealing within body 16.

Capsule holders 103 with bodies 16 and formed and sealed filters 14 are then transferred to ingredients station 124 and inverted so that capsules 10 are disposed with openings 36 in an upward facing orientation with ingredients chamber exposed for receiving ingredients. Capsules 10 with ingredients 16 may then be transferred using transfer element 102a to subsequent stations for further operations.

Referring to FIG. 16, a more detailed schematic view of system 100 is shown. System 100 comprises at least one transfer belt 102 having a plurality of capsule holders 103 adapted to cyclically and sequentially transfer capsules 10 from a working station to a following station as described further below. While only a single capsule holder 103 is shown at each station for system 100 it will be understood that transfer belt 102 has multiple capsule holders 103 disposed at each station in order that manufacturing operations may be performed simultaneously on multiple capsules at each station.

System 100 includes a body forming station 104 for engaging a sheet of moldable multilayered body material 106 with a heated mandrel 108 to form body 12 in accordance with body forming step 1002. Alternatively, body forming station may be replaced with a body supply station 104A having a body supplier, such as a denester, that denests previously formed bodies 12 from a body supply, and places each body 12 into a respective capsule holder 103.

Capsule holder 103 with body 12 is then transferred to a filter station 110 for forming and sealing filter 14 to body 12. Filter station 110 includes a filter forming station 110a and a filter sealing station 110b in accordance with filter forming step 1004 and filter sealing stem 1006. Details of different embodiments of filter forming station 110a and filter sealing station 110b have been described above with references to FIGS. 14 and 15 and will not be repeated here.

Capsule holder 103 with body 12 and filter 14 is then transferred to an ingredients station 124 having an ingredients supplier 126 for supplying a desired amount of ingredients 16 into ingredients chamber 46 in accordance with ingredients loading step 1008. A scale 128 weighs beverage capsule 10 to ensure that the desired amount of ingredients 16 have been disposed into ingredients chamber 46. Note that the embodiment described in FIG. 15 includes ingredients station 124.

If a dosing agent is required, then capsule holder 103 transfers body 12 with filter 14 and ingredients 16 to dosing agent station 130 having a dispenser 50 for dispensing a desired amount of dosing agent 40 into ingredients 16.

Following loading and dosing step 1008, capsule holder 103 then transfers body 12 with filter 14 and ingredients 16 with dosing agent 40 to cleaning station 132 where a vacuum conduit 134 cleans the exposed surface of flange 28 or gasket portion 50 of filter 14 in preparation for sealing with cover 18 in accordance with cleaning step 1010.

The system and process described above may either be performed in a non-modified atmospheric environment (such as a regular open-air manufacturing environment) or it may be performed in a modified atmospheric environment (such as an environment where air has been evacuated and replaced with an inert gas such as nitrogen). In a non-modified atmospheric environment, capsules 10 may need to be transferred to a modified atmospheric environment for the remaining steps of replacing the air within capsule with an inert gas and sealing cover 18 to body 12. In a modified atmospheric environment, capsules 10 already contain an inert gas and simply require cover 18 to be sealed to body 12.

Various options for forming hinge 50 on cover 18 are described below for both non-modified and modified atmospheric embodiments.

In a non-modified atmospheric environment, capsule holder 103 transfers body 12 with filter 14 and ingredients 16 with dosing agent 40 to a cover pre-sealing station 136 for receiving a supply of a cover material 138 and pre-sealing a portion of cover 18 to flange 38 of body 12 in accordance with pre-sealing step 1012. Pre-sealing may be accomplished for example by thermal welding (heat sealing) or ultrasonic welding. Cover pre-sealing station 136 leaves openings 188 along edge of cover 18 for allowing air to be evacuated and inert gas to be flushed into capsule during the modified atmosphere packaging (MAP) process step 1014 as described in more detail below. Cover material 138 may be supplied in the form of pre-cut covers 12 that are picked and placed on body 12 for pre-sealing. Alternatively, a roll of cover material 138 may be provided and each cover 18 may be cut to a desired size prior to or following the step of pre-sealing cover 18 to body 12.

Referring to FIGS. 17(a) and (b), one approach to pre-sealing cover 18 to body 12 is shown. In FIG. 17(a), cover 18 is pre-sealed at a first temperature T1 in specific locations around flange 38 to form a peelable seal. Cover 18 is also sealed at hinge zone 58 to define hinge 50. Hinge 50 is formed at a second temperature T2 and/or using a different sealing technique (such as an ultrasonic weld instead of a thermal weld) to form a stronger seal than the seal in peel zone 56. In FIG. 17(b), cover 18 is subsequently sealed, following the MAP process described below, entirely around flange 38 to define a peelable seal in peel zone 56 and to fully seal capsule 10.

Referring to FIGS. 18(a) and (b), another approach to pre-sealing cover 18 to body 12 is shown. In FIG. 18(a), cover 18 is pre-sealed at a first temperature T1 in specific locations around flange 38 to form a peelable seal. In FIG. 18(b), cover 18 is subsequently sealed, following the MAP process described below, around peel zone 56 at temperature T1. Hinge 50 is formed in hinge zone 58 at a second temperature T2 and/or using a different sealing technique (such as an ultrasonic weld instead of a thermal weld) to form a stronger seal than the seal in peel zone 56.

Hinge 50 may be formed in a two-stage process where the seal in hinge zone 58 is formed at one stage and the seal in peel zone is formed at another stage. Alternatively, hinge 50 may be formed in a single-stage process where a hinge applicator tool (not shown) having two different sealing heads is provided. One sealing head is adapted for forming a peelable seal in peel zone 56 of capsule 10 and the other sealing head is adapted for forming a relatively non-peelable seal in hinge zone 58 of capsule. The sealing heads of the hinge applicator tool may be adapted to operate at different sealing temperatures T1 and T2 and/or it may be adapted to perform different sealing operations (such as a thermal weld and an ultrasonic weld).

Partially sealed capsules 10 are then transferred from capsule holders 103 in transfer plate 102 to corresponding capsule holders 176 disposed within a transfer plate 178 using a pick-and-place device (not shown) or other suitable mechanism. Capsule holders 176 and transfer plate 178 are specially adapted for use during the MAP process step 1014.

Transfer plate 178 with partially sealed beverage capsules 10 disposed in capsule holders 176 is then moved to a MAP station 170 for execution of the MAP process step 1014 as described in more detail in US patent publication 20140141128 which is incorporated herein in its entirety by reference. Once the MAP process is complete, openings 188 in cover 18 are sealed with sealer 192 in accordance with sealing step 1016 and the finished capsule 10 is transferred using a pick-and-place device (not shown) or other suitable mechanism to a collection station 140 for subsequent packaging into boxes (not shown).

In a modified atmospheric environment, capsule holder 103 transfers body 12 with filter 14 and ingredients 16 with dosing agent 40 to a final cover sealing station 136 for receiving a supply of a cover material 138 and sealing cover 18 to flange 28 of body 12 in accordance with sealing step. Sealing may be accomplished by thermal welding (heat sealing) or ultrasonic welding. Cover material 138 may be supplied in the form of pre-cut covers 12 that are picked and placed on body 12 for pre-sealing. Alternatively, a roll of cover material 138 may be provided and each cover 18 may be cut to a desired size prior to or following the step of pre-sealing cover 18 to body 12.

In the modified atmospheric environment, hinge 50 may be formed prior to the final sealing step, after the final sealing step or during the final sealing step. Hinge 50 may be formed is a similar manner as discussed above with reference to FIGS. 17 and 18. Thus, cover 18 may be sealed to hinge zone of flange 38 at temperature T2 and/or by using a different sealing technique (such as an ultrasonic weld instead of a thermal weld) to define hinge 50 and the remainder of cover may be sealed to peel zone of flange 38 at temperature T1 and/or by using a different sealing technique (such as an thermal weld instead of an ultrasonic weld). Alternatively, cover 18 may first be sealed around flange 38 at temperature T1 to define peel zone 56 and then cover 18 may be sealed at hinge zone 58 to define hinge 50.

It will be understood that system 100 and process 1000 do not require all stations and steps to be provided. It will also be understood that the relative position of stations or the order of process steps may be changed depending on the desired structure and contents of the finished capsule 10.

While the above description provides examples of one or more processes or apparatuses, it will be appreciated that other processes or apparatuses may be within the scope of the accompanying claims.

What is claimed is:

1. A system for forming and sealing a filter material into a capsule, the system comprising:
    a filter forming station having at least one mandrel for forming a filter preform having a desired size and shape;
    a capsule holder for holding a body of a capsule in a position for receiving said mandrel with said filter preform; and
    a filter sealing station including a sealer for sealing said filter preform to said body at a desired location within the interior surface of said body,
    wherein said mandrel is adapted to hold said filter preform at a desired position prior to placement and sealing within said body.

2. A system as claimed in claim 1 further comprising a filter preform station having a head for engaging a sheet of filter material to form said filter preform on said mandrel.

3. A system as claimed in claim 1 wherein said filter preform is formed from a filter material having a basis weight of less than 40 gsm.

4. A system as claimed in claim 1 wherein said mandrel with said filter preform is disposed in an opposing orientation to said capsule holder with said body in order that said filter preform is held at said desired position on said mandrel with the aid of gravity.

5. A system as claimed in claim 1 wherein said capsule holder is adapted to hold said body of said capsule in a downward facing orientation for receiving said mandrel with said filter preform where said mandrel is disposed in an upward facing orientation.

6. A system as claimed in claim 1 wherein there is an attractive relationship between said mandrel and said filter preform in order for said mandrel to hold said filter preform at a desired position for placement and sealing within said body.

7. A system as claimed in claim 1 wherein said mandrel has a roughened exterior surface to provide sufficient frictional contact with said filter preform to hold said filter preform at a desired position for placement and sealing within said body.

8. A system as claimed in claim 1 wherein filter forming station further comprises a vacuum generator for generating a vacuum within said mandrel to hold said filter preform at a desired position for placement and sealing within said body.

9. A system as claimed in claim 1 wherein said mandrel is formed of a material having a physical attraction to said filter preform to hold said filter preform at a desired position for placement and sealing within said body.

10. A system as claimed in claim 1 further comprising an ingredient loading station for loading desired ingredients into an ingredients chamber defined by said filter after said filter has been formed and sealed to said body.

11. A system as claimed in claim 10 further comprising a sealing station for sealing a cover to said capsule after said ingredients have been loaded into said capsule.

12. A system as claimed in claim 1 wherein at least one of said mandrel and said capsule holder are adapted to rotate into position for sealing said filter preform to said body.

13. A system as claimed in claim 1 wherein said mandrel is disposed on a transfer belt for moving between said filter forming station to said filter sealing station.

14. A system as claimed in claim 13 wherein said capsule holder with said body is movable from a downward facing position, for receiving an upward facing mandrel with filter preform, and an upward facing position, for receiving ingredients at an ingredient loading station.

15. A system as claimed in claim 1 wherein at least a portion of said mandrel is adapted to move linearly along its axis to a desired position for sealing said filter preform to said body.

16. A process for forming and sealing a filter material into a capsule, the process comprising the steps of:
    forming a filter preform having a desired size and shape on a mandrel of a filter station of a system from a desired filter material;
    positioning a body of a capsule in a position for receiving said mandrel with said filter preform, said mandrel being adapted to hold said filter preform at a desired position prior to placement and sealing within said body; and sealing, in a filter sealing station of the system, said filter preform at a desired location to an interior surface of said body.

17. A process as claimed in claim 16 wherein said filter preform is held at said desired position on said mandrel with the aid of gravity.

18. A process as claimed in claim 16 wherein said body of said capsule is positioned in a downward facing orientation and said mandrel with said filter preform is positioned in an upward facing orientation when said filter preform is being sealed to said body.

19. A process as claimed in claim 16 further comprising a step of loading, using an ingredient loading station of the system, desired ingredients into an ingredients chamber defined by said filter after said filter has been formed and sealed to said body.

20. A system as claimed in claim 19 further comprising a step of sealing, in a cover sealing station of the system, a cover to said capsule after said ingredients have been loaded into said capsule.

\* \* \* \* \*